United States Patent
Resconi et al.

(10) Patent No.: US 8,729,206 B2
(45) Date of Patent: May 20, 2014

(54) SOLID PARTICULATE CATALYSTS COMPRISING BRIDGED METALLOCENES

(75) Inventors: Luigi Resconi, Porvoo (FI); Pascal Castro, Helsinki (FI); Lauri Huhtanen, Loviisa (FI); Norbert Hafner, Linz (AT)

(73) Assignee: Borealis AG, Vienna (AT)

( * ) Notice: Subject to any disclaimer, the term of this patent is extended or adjusted under 35 U.S.C. 154(b) by 5 days.

(21) Appl. No.: 13/643,865

(22) PCT Filed: Apr. 27, 2011

(86) PCT No.: PCT/EP2011/056673
§ 371 (c)(1), (2), (4) Date: Feb. 7, 2013

(87) PCT Pub. No.: WO2011/135005
PCT Pub. Date: Nov. 3, 2011

(65) Prior Publication Data
US 2013/0131291 A1    May 23, 2013

(30) Foreign Application Priority Data

Apr. 28, 2010 (EP) .................................. 10161364
Dec. 22, 2010 (EP) .................................. 10196564

(51) Int. Cl.
*C08F 110/06* (2006.01)
*C08F 4/642* (2006.01)
*C08F 4/6592* (2006.01)

(52) U.S. Cl.
CPC ............. *C08F 110/06* (2013.01); *C08F 4/6428* (2013.01); *C08F 4/6592* (2013.01); *Y10S 526/943* (2013.01)
USPC ............ 526/351; 526/160; 526/165; 526/943

(58) Field of Classification Search
None
See application file for complete search history.

(56) References Cited

U.S. PATENT DOCUMENTS 7,834,205 B2 * 11/2010 Resconi et al. ................ 556/53

FOREIGN PATENT DOCUMENTS

| WO | WO-03/051934 A2 | 6/2003 |
| WO | WO-2006/069733 A1 | 7/2006 |
| WO | WO-2007/116034 A1 | 10/2007 |
| WO | WO-2011/135004 A2 | 11/2011 |

OTHER PUBLICATIONS

Busico V, et al. (2001) Microstructure of polypropylene. *Progress in Polymer Science*, 26(3): 443-533.
De Rosa C, et al. (2005) Crystallization Behavior and Mechanical Properties of Regiodefective, Highly Stereoregular Isotactic Polypropylene: Effect of Regiodefects versus Stereodefects and Influence of the Molecular Mass. *Macromolecules*, 38: 9143-9154.
Enders A, et al. (2000) Die fluorige Phase: Organische Chemie mit hochfluorierten Reagenzien und Lösungsmitteln. *Chemie in unserer Zeit*, 34(6): 382-393.
Gahleitner, et al. (2011) International Polymer Processing, 26: 2-20.
Lo Nostro P, et al. (1995) Phase separation properties of fluorocarbons, hydrocarbons and their copolymers. *Advances in Colloid and Interface Science*, 56: 245-287.
International Preliminary Report issued by the International Bureau on Oct. 30, 2012 for PCT/EP2011/056672 filed Apr. 27, 2011 and published as WO 2011/135004 on Nov. 3, 2011 (Applicants—Borealis AG; Inventors—Resconi, et al.) (7 pages).
International Search Report mailed by the International Bureau on Aug. 23, 2012 for PCT/EP2011/056672 filed Apr. 27, 2011 and published as WO 2011/135004 on Nov. 3, 2011 (Applicants—Borealis AG; Inventors—Resconi, et al.) (5 pages).
Written Opinion mailed by the International Bureau on Aug. 23, 2012 for PCT/EP2011/056672 filed Apr. 27, 2011 and published as WO 2011/135004 on Nov. 3, 2011 (Applicants—Borealis AG; Inventors—Resconi, et al.) (6 pages).
International Preliminary Report on Patentability issued on Oct. 30, 2012 for PCT/EP2011/056673 field on Apr. 27, 2011 and published as WO 2011/135005 on Nov. 3, 2011 (Applicant—Borealis AG; Inventors—Resconi, et al.) (8 pages).
International Search Report mailed on Jan. 13, 2012 for PCT/EP2011/056673 filed on Apr. 27, 2011 and published as WO 2011/135005 on Nov. 3, 2011 (Applicant—Borealis AG; Inventors—Resconi, et al.) (5 pages).
Written Opinion mailed on Jan. 13, 2012 for PCT/EP2011/056673 filed on Apr. 27, 2011 and published as WO 2011/135005 on Nov. 3, 2011 (Applicant—Borealis AG; Inventors—Resconi, et al.) (7 pages).
Preliminary Amendment filed with the USPTO on Oct. 26, 2012 for U.S. Appl. No. 13/643,858, filed Jan. 17, 2013 (Applicant—Borealis AG; Inventor—Resconi, et al.) (10 pages).

* cited by examiner

*Primary Examiner* — Caixia Lu
(74) *Attorney, Agent, or Firm* — Ballard Spahr LLP

(57) ABSTRACT

A polypropylene homopolymer with a melting point of less than 147° C., a percentage of 2.1 errors of at least 1% and a xylene soluble fraction of less than 0.5 wt %.

18 Claims, 1 Drawing Sheet

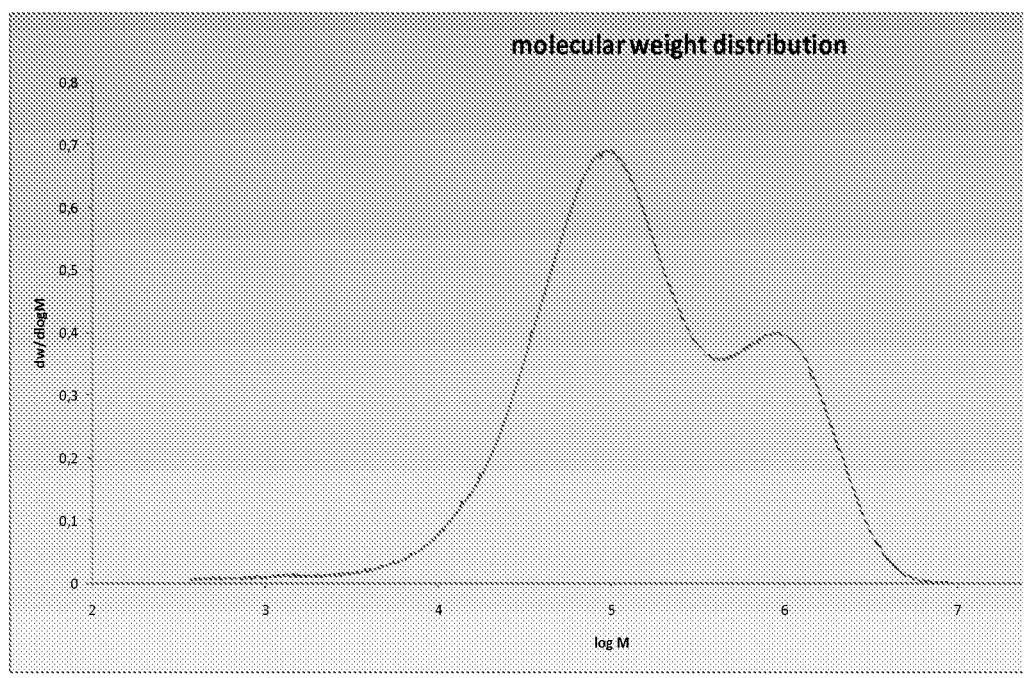

SOLID PARTICULATE CATALYSTS COMPRISING BRIDGED METALLOCENES

CROSS-REFERENCE TO RELATED APPLICATIONS

The present application is a U.S. National Phase Application of International Application No. PCT/EP2011/056673, filed Apr. 27, 2011, which claims priority to European Patent Application No. 10161364.4, filed Apr. 28, 2010, and European Patent Application No. 10196564.8, filed Dec. 22, 2010, all of which applications are incorporated herein fully by this reference.

This invention relates to polypropylene polymers which can be obtained by polymerisation with catalysts comprising bridged bis indenyl Π-ligands as well as the use thereof in the manufacture of polymer articles such as films and moulded articles. In particular, the invention relates to polypropylene homopolymers made by catalysts which comprise certain bridged bis indenyl complexes in solid form, and especially in solid form but without the use of an external support.

Metallocene catalysts have been used to manufacture polyolefins for many years. Countless academic and patent publications describe the use of these catalysts in olefin polymerisation. Metallocenes are now used industrially and polyethylenes and polypropylenes in particular are often produced using cyclopentadienyl based catalyst systems having different substitution patterns.

These metallocenes can be used in solution polymerisation or they can be carried on conventional supports such as silica.

In WO03/051934, the inventors proposed an alternative form of catalyst which is provided in solid form but does not require a conventional external carrier material such as silica. The invention is based on the finding that a homogeneous catalyst system containing an organometallic compound of a transition metal can be converted, in a controlled way, to solid, uniform catalyst particles by first forming a liquid/liquid emulsion system, which comprises a homogeneous solution of catalyst components as the dispersed phase, and as the continuous phase solvent where the catalyst solution is as dispersed droplets therewith, and then solidifying said dispersed droplets to form solid particles comprising the said catalyst.

The invention described in WO03/051934 enabled the formation of solid spherical catalyst particles of said organotransition metal catalyst without using e.g. external porous carrier particles, such as silica, normally required in the art. It could be seen that catalyst particles having improved morphology, will give, due to the replica effect, polymer particles having improved morphology.

Although a lot of work has been done in the field of metallocene catalysts, both with conventional supported catalysts as well with solid catalysts prepared according to the principles as described in WO03/051934, there remain problems, which relate especially to the production of polymers of low melt flow rate (i.e. high molecular weight) and low melting point.

Furthermore, there is a need for better polymer properties than can be achieved using existing catalysts. For example, while one direction of development of new catalysts has been, and still is, aimed at increasing the catalyst stereoselectivity, so as to obtain polypropylenes of higher isotacticity and higher stiffness, another equally important line of development has been aimed at finding catalysts able to produce polypropylenes of lower chain regularity by introducing controlled amounts of stereoerrors or regioerrors randomly distributed in the polymer chains, in order to obtain polypropylenes of lower melting point but still free of a fully amorphous, soluble fraction.

In the case of regioerrors, the influence of such chain defects has so far only been measured on polypropylenes with very low amounts of such defects, as described, for example, in Macromolecules 2005, 38, 9143-9154. In order to obtain polypropylenes with high crystallinity but lower melting points, the amount of such defects needs to be increased. An especially desired and useful combination of polypropylene properties, not yet described in the art, would be low MFR (that is high molecular weight) combined with a high amount of regiodefects.

Thus, there remains a need to find catalysts capable of providing these properties and preferably having an improved activity, especially in the desired MFR area. In addition, it is highly desired that the catalyst has a good activity when lower hydrogen concentrations are used in a polymerisation, i.e. polymers with lower MFR are produced.

The present inventors have found a new class of olefin polymerisation catalysts not previously described in the art, and which are able to solve the problems disclosed above and provide the polymers of the invention. The inventors have found that using special metallocene complexes as disclosed in WO2007/116034 in solid form, these problems can be solved.

The present invention covers polymers which can be made using catalysts formed using the catalyst solidification techniques of WO03/051934 with some metallocene complexes of said WO2007/116034.

Thus, some of the complexes used in the manufacture of the catalysts are not, as such, new. No-one before has considered the benefits of using these particular catalysts in solid form, and especially not in solid form but without an external support. The resulting catalyst surprisingly provides the desired increase in regioerrors at low MFR values. Moreover, the catalyst of the invention is able to provide characteristics in the formed polymer not previously associated with catalysts in solid form.

In particular, catalyst activity is very high, especially with low hydrogen concentrations (i.e. when polymers with low MFR, i.e. higher molecular weight, Mw are produced) within the polymerisation reactor compared to the homogeneous catalysts of WO2007/116034. Similarly therefore $MFR_2$ and $MFR_{21}$ are lower at a given hydrogen concentration relative to other known solid but unsupported catalysts. Intrinsic viscosity is also a measure of molecular weight, i.e. higher viscosity indicates higher molecular weight and the catalysts of the invention provide polymers of high intrinsic viscosity relative to other known solid but unsupported catalysts under the same polymerisation conditions.

It has also been seen that the amount of regioerrors is higher with the catalysts of the present invention compared to the homogeneous catalysts. These catalysts are therefore able to make polymers of lower melting point, but still of high isotacticity. Moreover, the polymers formed by the catalysts of the invention have low xylene soluble content.

SUMMARY OF INVENTION

Thus, viewed from a first aspect the invention provides a polypropylene homopolymer with a melting point of less than 147° C., a percentage of 2.1 errors of at least 1% and a xylene soluble fraction of less than 0.5 wt %.

Viewed from a further aspect the invention provides a polypropylene homopolymer with a melting point of less than 147° C., a percentage of 2.1 errors of at least 1% and a xylene soluble fraction of less than 0.5 wt % obtainable using a metallocene catalyst.

Viewed from a further aspect the invention provides a polypropylene homopolymer with a melting point of less than 147° C., a percentage of 2.1 errors of at least 1% and a xylene soluble fraction of less than 0.5 wt % obtainable using a metallocene catalyst which is a solid, particulate catalyst, preferably free from an external carrier, comprising:

(i) a complex of formula (I):

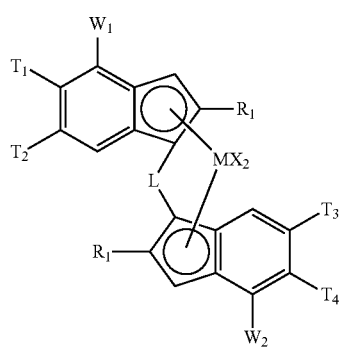

wherein

M is zirconium or hafnium;

each X is a sigma ligand;

L is a divalent bridge selected from —R'$_2$C—, —R'$_2$C—CR'$_2$—, —R'$_2$Si—, —R$_2$Si—SiR'$_2$—, —R'$_2$Ge—, wherein each R' is independently a hydrogen atom, C1-C20-alkyl, tri(C1-C20-alkyl)silyl, C6-C20-aryl, C7-C20-arylalkyl or C7-C20-alkylaryl;

each $R_1$ independently is a linear or branched C1-C20 hydrocarbyl radical optionally containing one or more heteroatoms from groups 14-16;

$T_1$ and $T_4$, which can be the same or different, are an $OR^2$, $SR^2$, $CH(R^{18})_2$, $CH_2R^{18}$, aryl or heteroaryl group;

each $R^2$, which can be the same or different, is a C1-C20 hydrocarbyl radical;

each $R^{18}$, which can be the same or different, is a C1-C20 hydrocarbyl radical or two $R^{18}$ groups together with the carbon atom to which they are attached may form a cyclic C4-C20 hydrocarbyl group;

$T_2$ and $T_3$, which may be the same or different, are a $C(R^{18})_3$ group;

$W_1$ and $W_2$, which may be the same or different, are a 5 or 6 membered aryl or heteroaryl ring wherein each atom of said ring is optionally substituted with an $R^5$ group;

each $R^5$, which can be the same or different, is a C1-C20 hydrocarbyl radical optionally containing one or more heteroatoms belonging to groups 14-16; and optionally two adjacent $R^5$ groups taken together can form a further mono or multicyclic ring condensed to $W_1$ or $W_2$, optionally substituted by one or two groups $R_5$;

and (ii) a cocatalyst.

In particular, the invention provides a propylene homopolymer as hereinbefore described obtainable using a solid, particulate catalyst free of external carrier and comprising (i) a complex of formula (I) as defined above and (ii) a cocatalyst, and especially being a catalyst obtainable by a process in which (I) a liquid/liquid emulsion system is formed, said liquid/liquid emulsion system comprising a solution of the catalyst components (i) and (ii) dispersed in a solvent so as to form dispersed droplets therewith; and (II) solid particles are formed by solidifying said dispersed droplets.

Viewed from another aspect the invention provides an article comprising a propylene homopolymer as hereinbefore defined.

Viewed from another aspect the invention provides the use of a propylene homopolymer as hereinbefore defined in the manufacture of an article such as a polymer film or moulded article.

Viewed from another aspect the invention provides a process for the preparation of a polypropylene homopolymer with a melting point of less than 147° C., a percentage of 2.1 errors of at least 1% and a xylene soluble fraction of less than 0.5 wt % comprising polymerising propylene in the presence of a metallocene catalyst as hereinbefore defined.

DEFINITIONS

Throughout the description the following definitions are employed.

By free from an external carrier is meant that the catalyst does not contain an external inorganic or organic support such as silica or alumina or polymeric support material.

By particulate is meant that the catalyst material of the invention exists as particles, typically as a free flowing powder, typically of around 1 to 500 μm in diameter.

The term $C_{1-20}$ hydrocarbyl group covers any $C_{1-20}$ group comprising carbon and hydrogen only. Any $C_{1-20}$ hydrocarbyl group is preferably a $C_{1-15}$ hydrocarbyl group, more preferably a $C_{1-10}$ hydrocarbyl group, especially a $C_{1-6}$ hydrocarbyl group.

The term $C_{1-20}$ hydrocarbyl group therefore includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups.

Unless otherwise stated, preferred $C_{1-20}$ hydrocarbyl groups are $C_{1-20}$ alkyl groups or $C_{6-20}$ aryl groups, especially $C_{1-10}$ alkyl groups or $C_{6-10}$ aryl groups, e.g. $C_{1-6}$ alkyl groups. Most especially preferred hydrocarbyl groups are methyl, ethyl, propyl, isopropyl, tertbutyl, phenyl or benzyl.

The term aryl preferably means C6-10 aryl optionally substituted with one or two $C_{1-6}$alkyl groups, e.g. methyl or tertbutyl groups.

The term halogen includes fluoro, chloro, bromo and iodo groups, especially chloro groups, when relating to the complex definition.

The term heteroaryl means a monocyclic aromatic ring structure comprising at least one heteroatom. Preferred heteroaryl groups have 1 to 4 heteroatoms selected from O, S and N. Preferred heteroaryl groups include furanyl, thiophenyl, oxazole, thiazole, isothiazole, isooxazole, triazole and pyridyl.

Any group including "one or more heteroatoms belonging to groups 14-16" preferably means Si, O, S or N. N groups may present as —NH— or —NR"— where R" is C1-10 alkyl.

The oxidation state of the metal ion is governed primarily by the nature of the metal ion in question and the stability of the individual oxidation states of each metal ion. Typically, however the metal ions will be in the 3+ or 4+ oxidation state especially 4+.

It will be appreciated that in the complexes of the invention, the metal ion M is coordinated by ligands X so as to satisfy the valency of the metal ion and to fill its available coordination sites. The nature of these σ-ligands can vary greatly.

The solvent, where the catalyst solution is dispersed can be immiscible or at least not totally miscible with the catalyst solution phase.

DETAILED DESCRIPTION OF INVENTION

This invention relates to novel propylene homopolymers which have low melting points and high molecular weight. These polymers can be obtained by polymerisation of propylene in the presence of certain catalysts as described in detail herein.

In particular therefore the invention relates to a polypropylene homopolymer with a melting point of less than 147° C., a percentage of 2.1 errors of at least 1% and a xylene soluble fraction of less than 0.5 wt %.

Ideally the percentage of 2.1 errors is more than 1.5%. The molecular weight of the polypropylene can be at least 300,000, preferably at least 400,000, especially at least 500,000. Some polymers can have molecular weights (Mw) of at least 800,000.

Melting points can be reduced to less than 145° C., e.g. less than 144° C. The lower limit for the melting point is preferably 138° C., e.g. 140° C.

Xylene soluble values are preferably very low, such as less than 0.5 wt %, especially less than 0.35 wt %.

A further highly preferred polymer is therefore a polypropylene homopolymer with a melting point of less than 147° C., a percentage of 2.1 errors of at least 1%, a xylene soluble fraction of less than 0.5 wt % and a Mw of at least 500,000.

Viewed from another aspect the invention provides a process for the preparation of a polypropylene homopolymer with a melting point of less than 147° C., a percentage of 2.1 errors of at least 1% and a xylene soluble fraction of less than 0.5 wt % comprising polymerising propylene in the presence of a metallocene catalyst as hereinbefore defined.

The polymers of the invention are propylene homopolymers and are therefore free of any comonomer content.

The low melting point characteristic of the polymers of the invention is due to a higher than usual content of regioerrors. Ideally melting points are less than 147° C. Melting points are preferably measured in the absence of nucleating agents. Preferably, melting points can be in the range 140 to less than 147° C., e.g. 140 to less than 147° C., such as 141 to 146° C., preferably 142 to 146° C. Melting points are measured using DSC as described in the tests section below.

As noted above, it is the high content of regioerrors which contribute to this low melting point. The term regioerror or regiodefect is used herein to refer to 2.1-insertions in the polymer chain. The regiodefects content of the polymers of the invention (2.1-errrors) is therefore at least 1%, preferably at least 1.2%, e.g. at least 1.4%. These values can be determined by $^{13}$C NMR, using the techniques explained in the tests section at the end of the description.

Whilst regiodefects are high, stereodefects are low. The term stereodefects or stereoerrors is used herein to refer to isolated primary units of opposite chiral configuration compared to the neighboring units in the polymer chain Reference is made to Busico et al. Progr. Polym. Sci. 2001, pages 447, 448. The amount of stereoerrors is defined by the concentration of rr triads as measured by $^{13}$C NMR, and is preferably less than 0.2%, e.g. less than 0.15%.

The crystallisation temperature of the polymers of the invention is also interesting, in particular in relation to the multimodal embodiment described below. The crystallisation temperature may be in the range 100 to 115° C., such as 100 to 110° C. As noted below however, Tc can be even higher, e.g. up to 122° C. when polymers are nucleated. For nucleated polymers therefore Tc values may be at least 115° C., such as at least 118° C.

A correlation between the presence of chain stereodefects, melting point, and stiffness is known. However, no one has previously reported a connection between the presence of at least 1% of regiodefects and melting point. The present inventors have shown that a high content of the 2.1 errors is associated with lower melting points. These errors are introduced using the catalysts herein defined.

Moreover, these low melting points are achieved at high molecular weights such as at least 200,000, preferably at least 250,000 such as at least 300,000.

The xylene soluble fraction of the polymers of the invention is preferably less than 0.5% wt %, especially less than 0.4 wt %. Xylene soluble fractions even less than 0.3 wt-% are possible.

The overall combination therefore of low melting point, low xylene soluble fraction and high molecular weight provides a polymer with attractive combination of properties such as for example low stiffness without stickiness.

The polymers of the invention can be unimodal, i.e. are made in a single stage process. However, it is also within the scope of the invention to prepare multimodal, preferably bimodal, polyproylene homopolymers. These polymers are prepared in a multistage process.

Usually, a polymer comprising at least two fractions, which have been produced under different polymerisation conditions resulting in different (weight average) molecular weights and molecular weight distributions for the fractions, is referred to as "multimodal". Accordingly, the polymers of the invention can be multimodal. The prefix "multi" relates to the number of different polymer fractions present in the polymer. Thus, for example, a polymer consisting of two fractions only is called "bimodal". The form of the molecular weight distribution curve, i.e. the appearance of the graph of the polymer weight fraction as function of its molecular weight, of a multimodal polypropylene will show two or more maxima or at least be distinctly broadened in comparison with the curves for the individual fractions. For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima or at least be distinctly broadened in comparison with the curves for the individual fractions.

The multimodal polymers of the invention can be prepared in two or more stages. These can take place in different reactors or in a single reactor in which the polymerisation conditions are varied. For example, changing the hydrogen concentration within the reactor allows the formation of different polymers within the same polymerisation reactor.

Whilst multimodality does not change melting point it does increase crystallization temperatures. Values are often higher for the multimodal polymers of the invention as compared to unimodal polymers.

It will also be appreciated that the Mw/Mn values of multimodal polymers are a lot higher than unimodal polymers. Typical unimodal polymers from metallocene or single site catalysts have Mw/Mn values of less than 4, typically between 2 and 3. The multimodal polypropylenes of the invention can exhibit Mw/Mn values of up to 11. Preferred Mw/Mn values are at least 3.4, such as at least 4.0, e.g. for multimodal polymers and less than 4, e.g. less than 3.4 e.g. for unimodal polymers.

The $MFR_2$ of the polymers of the invention is preferably in the range of 0.01 to 100 g/10 min, preferably 0.02 to 30 g/10 min, preferably 0.1 to 25 g/10 min (measured at 230° C. as described below).

The polymers of the invention also exhibit valuable mechanical properties despite their low melting points. The polymers of the invention have lower elastic modulus compared to a standard Ziegler Natta produced polypropylene and also to any metallocene polypropylene having similar molecular weight distribution and higher $T_m$ than the polymers of the invention.

Multimodal polymers have higher ductility and toughness whilst still possessing low melting points.

The tensile modulus of polymers of the invention may be at least 1500 MPa, preferably at least 1650 MPa even at least 1800 MPa. In some embodiments however, the tensile modulus of the polymers may be less than 1900 MPa, e.g. less than 1800 MPa, such as less than 1700 MPa, e.g. less than 1680 MPa or less than 1650 MPa.

Tensile stress at break values can be at least 20 MPa. Tensile strain at break values may be at least 8%.

It is generally observed that broader Mw/Mn induces a higher tensile strain at break, without decreasing the tensile modulus. This means that bimodality increases the toughness of the material.

It will be appreciated that the polymers of the invention can comprise standard polymer additives well known in the art. These include UV stabilisers, antioxidants, pigments, fillers and so on.

It is especially preferred if the polymers of the invention are nucleated. Nucleation increases the crystallization temperature significantly, e.g. by up to 10° C. In this fashion therefore, a polymer with low melting point but high crystallisation temperature can be formed. The increase in melting temperature is much less, around 2° C. Thus, melting points of nucleated polymers might be a bit higher than corresponding non-nucleated polymers. The melting point of the polymer of the invention is thus preferably determined in the absence of a nucleating agent. The xylene soluble fraction of the nucleated homopolymer may also be a little higher than the equivalent non nucleated polymer. Again, therefore it is preferred if xylene soluble fraction is measured in the absence of any nucleating agent.

In a further embodiment, the invention provides a nucleated propylene homopolymer having a melting point of less than 150° C., preferably less than 149° C., a xylene soluble fraction of less than 1 wt %, preferably less than 0.5 wt % and a percentage of 2.1 errors of at least 1%, preferably at least 1.4%.

Ideally, the tensile modulus of such a nucleated propylene homopolymer will be at least 1650 MPa, preferably at least 1800 MPa. Preferably the Tc of such a nucelated polypropylene will be at least 115° C., preferably at least 118° C. Preferably the rr triad content of such a nucleated homopolymer will be less than 0.2%, preferably less than 0.15%.

Even more preferred is a nucleation of the α-modification and γ-modification of isotactic polypropylene which also increases the tensile modulus by about 5 to 15%. This may also improve gloss and transparency. Suitable α-nucleating agents are those commonly used in the art and listed for example in chapter 2 of the review by Gahleitner et al. in International Polymer Processing 26 (2011) p. 2-20. Especially suitable are inorganic nucleating agents such as talc.

Talc can be added in an amount of 0.05 to 1.00 wt. %. Other nucleating agents are organic particulate nucleating agents such as carboxylic or phosphoric acid salts with a substituted or un-substituted aromatic ring. These can be added in an amount of 0.01 to 0.40 wt. %. Other nucleating agents are polymeric nucleating agents such as poly(tetrafluoro ethylene) or isotactic poly(vinyl cyclohexane). These can be added in an amount of 0.001 to 0.20 wt. %. Other nulceating agent are soluble organic nucleating agents such as sorbitol derivatives, nonitol derivatives or aliphatic substituted trisamides. These can be added in an amount of 0.05 to 0.30 wt %.

Typical examples for suitable organic particulate nucleating agents are sodium benzoate, sodium 2,2'-methylene-bis-(4,6-di-tert-butylphenyl) phosphate (CAS No. 85209-91-2, trade name Adekastab NA-11, commercially available from Adeka Palmarole, France), a mixture consisting of 60 wt % Hydroxybis (2,4,8,10-tetra-tert. butyl-6-hydroxy-12H-dibenzo(d,g)(1,3,2)dioxaphosphocin 6-oxidato) aluminium (CAS No. 151841-65-5) and 40 wt % Li-myristate (CAS No. 20336-96-3) (trade name Adekastab NA-21, commercially available from Adeka Palmarole, France), the disodium salt of Cis-endo-bicyclo[2.2.1]heptane-2,3-dicarboxylic acid (CAS No. 351870-33-2; trade name Hyperform HPN-68, commercially available from Milliken Inc., USA). A typical examples for suitable polymeric nucleating agents is isotactic poly(vinyl cyclohexane) (CAS No. 25498-06-0). Typical examples for suitable soluble organic nucleating agents are 1,3:2,4-Bis(3,4-dimethylbenzylidene)sorbitol (CAS No. 135861-56-2; trade name Millad 3988, commercially available from Milliken Inc., USA), 1,2,3-trideoxy-4,6:5,7-bis-0 [(4-propylphenyl)methylene]-nonitol (CAS No. 882073-43-0; trade name Millad NX8000, commercially available from Miliken Inc., USA) and N,N',N"-tris-tert-Butyl-1,3,5-benzenetricarboxamide (CAS No. 745070-61-5; trade name Irgaclear XT386, commercially available from BASF AG, Germany).

The polymers of the invention are preferably prepared using a metallocene catalyst, in particular one comprising a complex of formula (I). It is preferred if the two multicyclic ligands making up the complex of formula (I) are identical. It is also preferred if a substituent on one ring is the same as the corresponding substituent on the other. Thus, both $R_1$'s are preferably the same and so on. Preferably, the metallocene compounds of the present invention are in their racemic (rac) or racemic-anti-form.

M is preferably zirconium Zr.

Each X, which may be the same or different, is preferably a hydrogen atom, a halogen atom, a R, OR, $OSO_2CF_3$, OCOR, SR, $NR_2$ or $PR_2$ group wherein R is a linear or branched, cyclic or acyclic, C1-C20-alkyl, C2-C20 alkenyl, C2-C20 alkynyl, C6-C20-aryl, C7-C20-alkylaryl or C7-C20-arylalkyl radical; optionally containing heteroatoms belonging to groups 14-16 or is $SiR_3$, $SiHR_2$ or $SiH_2R$. R is preferably a $C_{1-6}$ alkyl, phenyl or benzyl group.

Most preferably each X is independently a hydrogen atom, a halogen atom, $C_{1-6}$-alkoxy group or an R group, e.g. preferably a $C_{1-6}$ alkyl, phenyl or benzyl group. Most preferably X is chlorine or a methyl radical. Preferably both X groups are the same.

L is preferably a bridge comprising one or two heteroatoms, such as silicon or germanium atom(s), e.g. —$SiR^6_2$—, wherein each $R^6$ is independently C1-C20-alkyl, C6-C20-aryl or a tri(C1-C20-alkyl)silyl-residue, such as trimethylsilyl. More preferably $R^6$ is $C_{1-6}$-alkyl, especially methyl. L may also be an $C_{1-4}$-alkylene linkage, e.g. ethylene. Most preferably, L is a 1 or 2 atom bridge, especially a dimethylsilyl or ethylene bridge.

$R^1$ is preferably a linear or branched C1-20-alkyl, C2-C20 alkenyl, C2-C20 alkynyl radical or an aryl or arylalkyl radical containing from 4 to 20 carbon atoms optionally containing O, N, S, P or Si atoms, in particular O, N and S atoms such as 2-(5-Me-thiophenyl) or 2-(5-Me-furanyl) radicals.

More preferably $R^1$ is a linear or branched C1-10-alkyl radical, like a linear or branched C1-6-alkyl radical. $R^1$ is ideally linear C1-6 alkyl radical, preferably a methyl or ethyl radical.

Preferably $T_1$ and $T_4$ are an $OR^2$ or an $SR^2$ group or a C5-10 aryl or heteroaryl group, e.g. phenyl, cumyl or tolyl.

Preferably $R^2$ is a linear or branched, cyclic or acyclic, C1-C20-alkyl, C2-C20 alkenyl, C2-C20 alkynyl, C6-C20-aryl. More preferably $R^2$ is a linear or branched C1-10-alkyl radical, such as methyl, ethyl, isopropyl or tertbutyl.

Most preferably $T_1$ and $T_4$ are $OC_{1-6}$ alkyl especially methoxy or ethoxy. It is preferred if $T_1$ and $T_4$ are the same.

Preferably $R^{18}$ is a linear or branched, cyclic or acyclic, C1-20-alkyl, C2-C20 alkenyl, C2-C20 alkynyl, C6-C20-aryl, C7-C20-alkylaryl or C7-C20-arylalkyl radical, optionally containing one or more heteroatoms belonging to groups 14-16.

More preferably $R^{18}$ is a linear or branched, C1-10-alkyl radical. More preferably $R^{18}$ is a methyl or ethyl radical.

In a further preferred embodiment two $R^{18}$ groups along with the carbon atom to which they are attached form a C4-20 hydrocarbyl ring system, preferably a C5 to 10 ring system. Preferred rings are mono or bicyclic preferably monocyclic. Preferred rings are saturated or unsaturated, especially saturated. Most preferred rings are cyclopentyl or cyclohexyl.

$T_2$ and $T_3$ are preferably C4-C10 branched tertiary alkyl or two $R^{18}$ groups are a C4-10 cycloalkyl with the remaining $R^{18}$ group being C1-10 alkyl. Preferred options include, tert-butyl, 1-alkylcyclopentyl or 1-alkylcyclohexyl.

$W_1$ and $W_2$ are preferably the same. They are preferably an optional substituted phenyl group, or a 5 or 6 membered heteroaryl group such as a furanyl, thiophenyl, pyrrolyl, triazolyl and pyridyl.

Any five membered heteroaryl group should preferably comprise one heteroatom in the ring, such as O, N or S, preferably S.

Preferably $W_1$ and $W_2$ are a phenyl derivative or thiophenyl derivative. More preferably the phenyl/thiophene derivative is unsubstituted or carries one substituent.

The optional substitutent on any $W_1$ or $W_2$ group is $R^5$. If present, there should be 1 or 2 $R^5$ groups, preferably one $R^5$ group.

Preferably $R^5$ is a linear or branched, cyclic or acyclic, C1-C20-alkyl, C2-C20 alkenyl, C2-C20 alkynyl, C6-C20-aryl, C7-C20-alkylaryl or C7-C20-arylalkyl radical optionally containing one or more heteroatoms belonging to groups 14-16. Preferably $R^5$ is a C1-C6 alkyl such as methyl, isopropyl or tertbutyl.

In one preferred embodiment two adjacent $R^5$ groups taken together can form a further mono or multicyclic ring condensed to $W_1$ or $W_2$. The new ring is preferably 5 or 6 membered or the $R^5$ groups preferably form two new rings such a one further five membered and six membered ring.

The new ring or rings can be aliphatic or aromatic. Preferably any new ring forms an aromatic system with the $W_1$ or $W_2$ ring to which it is attached.

In this way groups such as carbazolyl, benzothiophenyl and naphthyl can be formed at position $W_1$ or $W_2$. It is also within the scope of the invention for these new rings to be substituted by 1 or 2 $R^5$ groups (in which the option of two adjacent $R^5$ groups forming another ring is excluded).

Highly preferably therefore $R^5$ is a linear or branched, cyclic or acyclic, C1-C10-alkyl group or two adjacent $R^5$ groups taken together can form a further mono or multicyclic aromatic ring condensed to $W_1$ and/or $W_2$.

In a most preferred embodiment, $W_1$ and $W_2$ are a phenyl group optionally carrying one $R^5$ substituent. Preferably that substituent is carried para to the bond to the indenyl ring.

In a preferred embodiment therefore the complex of use in the invention is of formula (II)

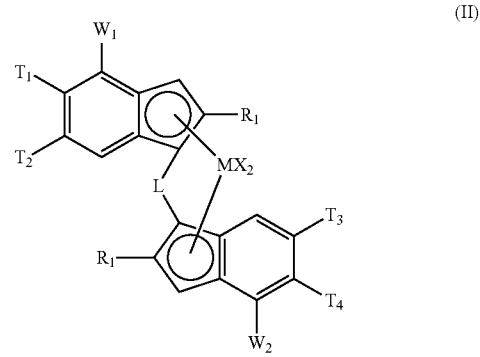

(II)

wherein
M is Zr or Hf, preferably Zr;
$R_1$ is a linear or branched C1-C10 alkyl;
L is ethylene or $SiR^6_2$;
$R^6$ is C1-C10 alkyl;
each X is a hydrogen atom, a halogen atom, an OR, or an R group;
R is methyl, ethyl, isopropyl, trimethylsilyl, or a C6-C10 aryl, preferably X is chlorine or methyl;
$W_1$ and $W_2$ are a phenyl derivative or thiophenyl derivative optionally carrying one or two $R^5$ groups.
$R^5$ is C1-C10 alkyl or two adjacent $R^5$ groups taken together can form a further mono or multicyclic ring condensed to $W_1$ or $W_2$ e.g. so as to form a benzothiophenyl group;
$T_1$ is OC1-C6 alkyl or a C6-C10 aryl;
$T_2$ is $C_4$-$C_{10}$ hydrocarbyl, preferably tertiary hydrocarbyl such as tert-butyl;
$T_3$ is $C_4$-$C_{10}$ hydrocarbyl, preferably tertiary hydrocarbyl such as tert-butyl; and
$T_4$ is OC1-C6 alkyl or a C6-C10 aryl;
In a preferred embodiment the complex of use in the invention is of formula (III)

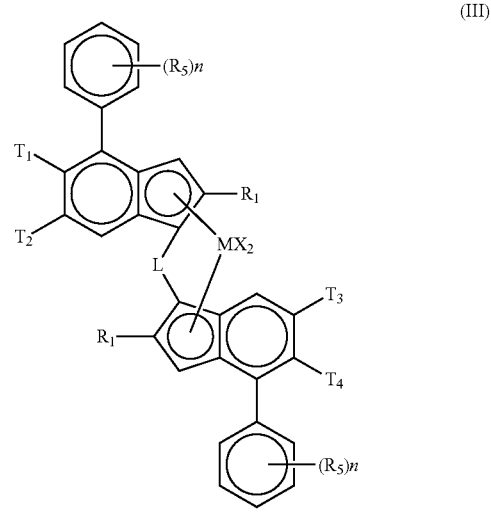

(III)

wherein
M is Zr or Hf, preferably Zr;
$R_1$ is a linear or branched C1-C10 alkyl;
L is ethylene or $SiR^6_2$;

R$^6$ is C1-C10 alkyl;

Each X is a hydrogen atom, a halogen atom, an OR, or an R group;

R is methyl, ethyl, isopropyl, trimethylsilyl, or a C6-C10 aryl, preferably X is chlorine or methyl n is 0 to 2;

R$^5$ is C1-C10 alkyl;

T$_1$ is O—C1-C6 alkyl or a C6-C10 aryl;

T$_2$ is C$_4$-C$_{10}$ hydrocarbyl, preferably tertiary hydrocarbyl such as tert-butyl;

T$_3$ is C$_4$-C$_{10}$ hydrocarbyl, preferably tertiary hydrocarbyl such as tert-butyl; and T$_4$ is O—C1-C6 alkyl or a C6-C10 aryl.

Examples of compounds having formula (I) are as follows racemic-Me$_2$Si(2-methyl-4-phenyl-5-methoxy-6-tert-butyl-inden-1-yl)$_2$ZrCl$_2$ racemic-Me$_2$Si(2-methyl-4-(thiophen-2-yl)-5-methoxy-6-tert-butylinden-1-yl)$_2$ZrCl$_2$ racemic-Me$_2$Si(2-methyl-4-(5-methylthiophen-2-yl)-5-methoxy-6-tert-butylinden-1-yl)$_2$ZrCl$_2$ racemic-Me$_2$Si(2-methyl-4-(benzothiophen-2-yl)-5-methoxy-6-tert-butylinden-1-yl)$_2$ZrCl$_2$ racemic-Me$_2$Si(2-methyl-4-(benzothiophen-2-yl)-5-methoxy-6-tert-butylinden-1-yl)$_2$ZrCl$_2$ racemic-Me$_2$Si(2-methyl-4-(4-pyridyl)-5-methoxy-6-tert-butylinden-1-yl)$_2$ZrCl$_2$ racemic-Me$_2$Si(2-methyl-4-(tert-butylphenyl)-5-methoxy-6-tert-butylinden-1-yl)$_2$ZrCl$_2$ racemic-Me$_2$Si(2-methyl-4-(tert-butylphenyl)-5-ethoxy-6-tert-butylinden-1-yl)$_2$ZrCl$_2$ racemic-Me$_2$Si(2-methyl-4-(2,5-dimethylphenyl)-5-methoxy-6-tert-butylinden-1-yl)$_2$ZrCl$_2$ racemic-Me$_2$Si(2-ethyl-4-phenyl-5-methoxy-6-tert-butylinden-1-yl)$_2$ZrCl$_2$ racemic-Me$_2$Si(2-propyl-4-phenyl-5-methoxy-6-tert-butylinden-1-yl)$_2$ZrCl$_2$ racemic-anti-Me$_2$Si(2-methyl-4-phenyl-5-methoxy-6-tert-butylinden-1-yl)(2-methyl-4-(5-methylthiophen-2-yl)-5-methoxy-6-tert-butylinden-1-yl)ZrCl$_2$;

racemic-anti-Me$_2$Si(2-methyl-4-phenyl-5-methoxy-6-tert-butylinden-1-yl)(2-methyl-4-(5-methylthiophen-2-yl)-5-ethoxy-6-tert-butylinden-1-yl)ZrCl$_2$ racemic-anti-Me$_2$Si(2-methyl-4-phenyl-5-methoxy-6-tert-butylinden-1-yl)(2-isopropyl-4-phenyl-5-methoxy-6-tert-butylinden-1-yl)ZrCl$_2$ racemic-Me$_2$Si(2-methyl-4-phenyl-5-methoxy-6-(1-methylcyclohexyl)inden-1-yl)$_2$ZrCl$_2$ and their correspondent dimethyl derivatives and further the corresponding hafnium compounds.

Throughout the disclosure above, where a narrower definition of a substituent is presented, that narrower definition is deemed disclosed in conjunction with all broader and narrower definitions of other substituents in the application.

Synthesis

The ligands required to form the catalysts of the invention can be synthesised by any process and the skilled organic chemist would be able to devise various synthetic protocols for the manufacture of the necessary ligand materials. WO2007/116034 discloses the necessary chemistry and is herein incorporated by reference.

Cocatalyst

To form an active catalytic species it is normally necessary to employ a cocatalyst as is well known in the art. Cocatalysts comprising an organometal compound of Group 13 metal, like organoaluminium compounds used to activate metallocene catalysts are suitable for use in this invention.

The olefin polymerisation catalyst system of the invention comprises (i) a complex in which the metal ion is coordinated by a ligand of the invention; and normally (ii) an aluminium alkyl compound (or other appropriate cocatalyst), or the reaction product thereof. Thus the cocatalyst is preferably an alumoxane, like MAO or an alumoxane other than MAO.

Alternatively, however, the catalysts of the invention may be used with other cocatalysts, e.g. boron compounds such as B(C$_6$F$_5$)$_3$, C$_6$H$_5$N(CH$_3$)$_2$H:B(C$_6$F$_5$)$_4$, (C$_6$H$_5$)$_3$C:B(C$_6$F$_5$)$_4$ or Ni(CN)$_4$[B(C$_6$F$_5$)$_3$]$_4^{2-}$. The use of aluminoxanes, especially MAO, is highly preferred.

Manufacture

The catalyst of the invention is a solid, and preferably no external carrier is used. In order to provide the catalyst of the invention in solid, particulate form but without using an external carrier, it is preferred if a liquid liquid emulsion system is used. This process involves dispersing catalyst components (i) and (ii) in a solvent to form dispersed droplets, and solidifying said dispersed droplets to form solid particles.

In particular, the method involves preparing a solution of one or more catalyst components; dispersing said solution in a solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape and particle size and without using any added external porous support material, such as an inorganic oxide, e.g. silica. Also desirable surface properties can be obtained.

By the term "preparing a solution of one or more catalyst components" is meant that the catalyst forming compounds may be combined in one solution which is dispersed to the immiscible solvent, or, alternatively, at least two separate catalyst solutions for each part of the catalyst forming compounds may be prepared, which are then dispersed successively to the solvent.

In a preferred method for forming the catalyst at least two separate solutions for each part of said catalyst may be prepared, which are then dispersed successively to the immiscible solvent.

More preferably, a solution of the complex comprising the transition metal compound and the cocatalyst is combined with the solvent, to form an emulsion wherein that inert solvent forms the continuous liquid phase and the solution comprising the catalyst components forms the dispersed phase (discontinuous phase) in the form of dispersed droplets. The droplets are then solidified to form solid catalyst particles, and the solid particles are separated from the liquid and optionally washed and/or dried. The solvent forming the continuous phase may be immiscible to the catalyst solution at least at the conditions (e.g. temperatures) used during the dispersing step.

Full disclosure of the necessary process can be found in WO03/051934 which is herein incorporated by reference.

The inert solvent must be chemically inert. Preferably, the solvent of said continuous phase does not contain dissolved therein any significant amounts of catalyst forming compounds. Thus, the solid particles of the catalyst are formed in the droplets from the compounds which originate from the dispersed phase (i.e. are provided to the emulsion in a solution dispersed into the continuous phase).

The terms "immobilisation" and "solidification" are used herein interchangeably for the same purpose, i.e. for forming free flowing solid catalyst particles in the absence of an external porous particulate carrier, such as silica. The solidification happens thus within the droplets. Said step can be effected in various ways as disclosed in said WO03/051934 Preferably solidification is caused by an external stimulus to the emulsion system such as a temperature change to cause the solidification. Thus in said step the catalyst component (s) remain "fixed" within the formed solid particles. It is also possible that one or more of the catalyst components may take part in the solidification/immobilisation reaction.

Accordingly, solid, compositionally uniform particles having a predetermined particle size range can be obtained.

Furthermore, the particle size of the catalyst particles of the invention can be controlled by the size of the droplets in the solution, and spherical particles with an uniform particle size distribution can be obtained.

The invention is also industrially advantageous, since it enables the preparation of the solid particles to be carried out as a one-pot procedure. Continuous or semicontinuous processes are also possible for producing the catalyst.

Dispersed Phase

The principles for preparing two phase emulsion systems are known in the chemical field. Thus, in order to form the two phase liquid system, the solution of the catalyst component (s) and the solvent used as the continuous liquid phase have to be essentially immiscible at least during the dispersing step. This can be achieved in a known manner e.g. by choosing said two liquids and/or the temperature of the dispersing step/solidifying step accordingly.

A solvent may be employed to form the solution of the catalyst component (s). Said solvent is chosen so that it dissolves said catalyst component (s). The solvent can be preferably an organic solvent such as used in the field, comprising an optionally substituted hydrocarbon such as linear or branched aliphatic, alicyclic or aromatic hydrocarbon, such as a linear or cyclic alkane, an aromatic hydrocarbon and/or a halogen containing hydrocarbon.

Examples of aromatic hydrocarbons are toluene, benzene, ethylbenzene, propylbenzene, butylbenzene and xylene. Toluene is a preferred solvent. The solution may comprise one or more solvents. Such a solvent can thus be used to facilitate the emulsion formation, and usually does not form part of the solidified particles, but e.g. is removed after the solidification step together with the continuous phase.

Alternatively, a solvent may take part in the solidification, e.g. an inert hydrocarbon having a high melting point (waxes), such as above 40° C., suitably above 70° C., e.g. above 80° C. or 90° C., may be used as solvents of the dispersed phase to immobilise the catalyst compounds within the formed droplets.

In another embodiment, the solvent consists partly or completely of a liquid monomer, e.g. liquid olefin monomer designed to be polymerised in a "prepolymerisation" immobilisation step.

Continuous Phase

The solvent used to form the continuous liquid phase is a single solvent or a mixture of different solvents and may be immiscible with the solution of the catalyst components at least at the conditions (e.g. temperatures) used during the dispersing step. Preferably said solvent is inert in relation to said compounds.

The term "inert in relation to said compounds" means herein that the solvent of the continuous phase is chemically inert, i.e. undergoes no chemical reaction with any catalyst forming component. Thus, the solid particles of the catalyst are formed in the droplets from the compounds which originate from the dispersed phase, i.e. are provided to the emulsion in a solution dispersed into the continuous phase.

It is preferred that the catalyst components used for forming the solid catalyst will not be soluble in the solvent of the continuous liquid phase. Preferably, said catalyst components are essentially insoluble in said continuous phase forming solvent.

Solidification takes place essentially after the droplets are formed, i.e. the solidification is effected within the droplets e.g. by causing a solidifying reaction among the compounds present in the droplets. Furthermore, even if some solidifying agent is added to the system separately, it reacts within the droplet phase and no catalyst forming components go into the continuous phase.

The term "emulsion" used herein covers both bi- and multiphasic systems.

In a preferred embodiment said solvent forming the continuous phase is an inert solvent including a halogenated organic solvent or mixtures thereof, preferably fluorinated organic solvents and particularly semi, highly or perfluorinated organic solvents and functionalised derivatives thereof. Examples of the above-mentioned solvents are semi, highly or perfluorinated hydrocarbons, such as alkanes, alkenes and cycloalkanes, ethers, e.g. perfluorinated ethers and amines, particularly tertiary amines, and functionalised derivatives thereof. Preferred are semi, highly or perfluorinated, particularly perfluorinated hydrocarbons, e.g. perfluorohydrocarbons of e.g. C3-C30, such as C4-C10. Specific examples of suitable perfluoroalkanes and perfluorocycloalkanes include perfluoro-hexane, -heptane, -octane and -(methylcyclohexane). Semi fluorinated hydrocarbons relates particularly to semifluorinated n-alkanes.

"Semi fluorinated" hydrocarbons also include such hydrocarbons wherein blocks of —C—F and —C—H alternate. "Highly fluorinated" means that the majority of the —C—H units are replaced with —C—F units. "Perfluorinated" means that all —C—H units are replaced with —C—F units. See the articles of A. Enders and G. Maas in "Chemie in unserer Zeit", 34. Jahrg. 2000, Nr.6, and of Pierandrea Lo Nostro in "Advances in Colloid and Interface Science", 56 (1995) 245-287, Elsevier Science.

Dispersing Step

The emulsion can be formed by any means known in the art: by mixing, such as by stirring said solution vigorously to said solvent forming the continuous phase or by means of mixing mills, or by means of ultra sonic wave, or by using a so called phase change method for preparing the emulsion by first forming a homogeneous system which is then transferred by changing the temperature of the system to a biphasic system so that droplets will be formed.

The two phase state is maintained during the emulsion formation step and the solidification step, as, for example, by appropriate stirring.

Additionally, emulsifying agents/emulsion stabilisers can be used, preferably in a manner known in the art, for facilitating the formation and/or stability of the emulsion. For the said purposes e.g. surfactants, e.g. a class based on hydrocarbons (including polymeric hydrocarbons with a molecular weight e.g. up to 10,000 and optionally interrupted with a heteroatom(s)), preferably halogenated hydrocarbons, such as semi- or highly fluorinated hydrocarbons optionally having a functional group selected e.g. from —OH, —SH, NH$_2$, NR"$_2$, —COOH, —COONH$_2$, oxides of alkenes, —CR"=CH$_2$, where R" is hydrogen, or C1-C20 alkyl, C2-20-alkenyl or C2-20-alkynyl group, oxo-groups, cyclic ethers and/or any reactive derivative of these groups, like alkoxy, or carboxylic acid alkyl ester groups, or, preferably semi-, highly- or perfluorinated hydrocarbons having a functionalised terminal, can be used. The surfactants can be added to the catalyst solution, which forms the dispersed phase of the emulsion, to facilitate the forming of the emulsion and to stabilize the emulsion.

Alternatively, an emulsifying and/or emulsion stabilising aid can also be formed by reacting a surfactant precursor bearing at least one functional group with a compound reactive with said functional group and present in the catalyst solution or in the solvent. The obtained reaction product acts as the actual emulsifying aid and or stabiliser in the formed emulsion system.

Examples of the surfactant precursors usable for forming said reaction product include e.g. known surfactants which bear at least one functional group selected e.g. from —OH, —SH, $NH_2$, $NR''_2$—COOH, —$COONH_2$, oxides of alkenes, —CR''=$CH_2$, where R" is hydrogen, or C1-C20 alkyl, C2-20-alkenyl or C2-20-alkynyl group, oxo-groups, cyclic ethers with 3 to 5 ring atoms, and/or any reactive derivative of these groups, like alkoxy or carboxylic acid alkyl ester groups; e.g. semi-, highly or perfluorinated hydrocarbons bearing one or more of said functional groups. Preferably, the surfactant precursor has a terminal functionality as defined above.

The compound reacting with such surfactant precursor is preferably contained in the catalyst solution and may be a further additive or one or more of the catalyst forming compounds. Such compound is e.g. a compound of group 13 (e.g. MAO and/or an aluminium alkyl compound) and/or a transition metal compound.

If a surfactant precursor is used, it is preferably first reacted with a compound of the catalyst solution before the addition of the transition metal compound. In one embodiment e.g. a highly fluorinated C1-n (suitably C4-30- or C5-15) alcohol (e.g. highly fluorinated heptanol, octanol or nonanol), oxide (e.g. propenoxide) or acrylate ester is reacted with a cocatalyst to form the "actual" surfactant. Then, an additional amount of cocatalyst and the transition metal compound is added to said solution and the obtained solution is dispersed to the solvent forming the continuous phase. The "actual" surfactant solution may be prepared before the dispersing step or in the dispersed system. If said solution is made before the dispersing step, then the prepared "actual" surfactant solution and the transition metal solution may be dispersed successively (e.g. the surfactant solution first) to the immiscible solvent, or be combined together before the dispersing step.

Soldification

The solidification of the catalyst component(s) in the dispersed droplets can be effected in various ways, e.g. by causing or accelerating the formation of said solid catalyst forming reaction products of the compounds present in the droplets. This can be effected, depending on the used compounds and/or the desired solidification rate, with or without an external stimulus, such as a temperature change of the system.

In a particularly preferred embodiment, the solidification is effected after the emulsion system is formed by subjecting the system to an external stimulus, such as a temperature change. Temperature differences of e.g. 5 to 100° C., such as 10 to 100° C., or 20 to 90° C., such as 50 to 90° C.

The emulsion system may be subjected to a rapid temperature change to cause a fast solidification in the dispersed system. The dispersed phase may e.g. be subjected to an immediate (within milliseconds to few seconds) temperature change in order to achieve an instant solidification of the component (s) within the droplets. The appropriate temperature change, i.e. an increase or a decrease in the temperature of an emulsion system, required for the desired solidification rate of the components cannot be limited to any specific range, but naturally depends on the emulsion system, i.e. on the used compounds and the concentrations/ratios thereof, as well as on the used solvents, and is chosen accordingly. It is also evident that any techniques may be used to provide sufficient heating or cooling effect to the dispersed system to cause the desired solidification.

In one embodiment the heating or cooling effect is obtained by bringing the emulsion system with a certain temperature to an inert receiving medium with significantly different temperature, e.g. as stated above, whereby said temperature change of the emulsion system is sufficient to cause the rapid solidification of the droplets. The receiving medium can be gaseous, e.g. air, or a liquid, preferably a solvent, or a mixture of two or more solvents, wherein the catalyst component (s) is (are) immiscible and which is inert in relation to the catalyst component (s). For instance, the receiving medium comprises the same immiscible solvent used as the continuous phase in the first emulsion formation step.

Said solvents can be used alone or as a mixture with other solvents, such as aliphatic or aromatic hydrocarbons, such as alkanes. Preferably a fluorinated solvent as the receiving medium is used, which may be the same as the continuous phase in the emulsion formation, e.g. perfluorinated hydrocarbon.

Alternatively, the temperature difference may be effected by gradual heating of the emulsion system, e.g. up to 10° C. per minute, preferably 0.5 to 6° C. per minute and more preferably in 1 to 5° C. per minute.

In case a melt of e.g. a hydrocarbon solvent is used for forming the dispersed phase, the solidification of the droplets may be effected by cooling the system using the temperature difference stated above.

Preferably, the "one phase" change as usable for forming an emulsion can also be utilised for solidifying the catalytically active contents within the droplets of an emulsion system by, again, effecting a temperature change in the dispersed system, whereby the solvent used in the droplets becomes miscible with the continuous phase, preferably a fluorous continuous phase as defined above, so that the droplets become impoverished of the solvent and the solidifying components remaining in the "droplets" start to solidify. Thus the immisciblity can be adjusted with respect to the solvents and conditions (temperature) to control the solidification step.

The miscibility of e.g. fluorous solvents with organic solvents can be found from the literature and be chosen accordingly by a skilled person. Also the critical temperatures needed for the phase change are available from the literature or can be determined using methods known in the art, e.g. the Hildebrand-Scatchard-Theorie. Reference is also made to the articles of A. Enders and G. and of Pierandrea Lo Nostro cited above.

Thus according to the invention, the entire or only part of the droplet may be converted to a solid form. The size of the "solidified" droplet may be smaller or greater than that of the original droplet, e.g. if the amount of the monomer used for the prepolymerisation is relatively large when a prepolymerisation step is used as the solidification step.

The solid catalyst particles recovered can be used, after an optional washing step, in a polymerisation process of an olefin. Alternatively, the separated and optionally washed solid particles can be dried to remove any solvent present in the particles before use in the polymerisation step. The separation and optional washing steps can be effected in a known manner, e.g. by filtration and subsequent washing of the solids with a suitable solvent.

The droplet shape of the particles may be substantially maintained. The formed particles may have an average size range of 1 to 500 μm, e.g. 5 to 500 μm, advantageously 5 to 200 μm or 10 to 150 μm. Even an average size range of 5 to 60 μm is possible. The size may be chosen depending on the nature of the polymerisation reaction for which the catalyst is used.

The formation of the catalyst solution can be effected at a temperature of 0-100° C., e.g. at 20-80° C. The dispersion step may be effected at −20° C.-100° C., e.g. at about −10-70° C., such as at −5 to 30° C., e.g. around 0° C.

To the obtained dispersion an emulsifying agent as defined above, may be added to improve/stabilise the droplet formation. The solidification of the catalyst component in the droplets is preferably effected by raising the temperature of the mixture, e.g. from 0° C. temperature up to 100° C., e.g. up to 60-90° C., gradually. E.g. in 1 to 180 minutes, e.g. 1-90 or 5-30 minutes, or as a rapid heat change. Heating time is dependent on the size of the reactor.

During the solidification step, which is preferably carried out at about 60 to 100° C., preferably at about 70 to 95° C., (below the boiling point of the solvents) the solvents may preferably be removed and optionally the solids are washed with a wash solution, which can be any solvent or mixture of solvents such as those defined above and/or used in the art, preferably a hydrocarbon, such as pentane, hexane or heptane, suitably heptane. The washed catalyst can be dried or it can be slurried into an oil and used as a catalyst-oil slurry in polymerisation process.

All or part of the preparation steps can be done in a continuous manner. Reference is made to WO2006/069733 describing principles of such a continuous or semicontinuous preparation methods of the solid catalyst types, prepared via emulsion/solidification method.

Polymerisation

Polymerization in the method of the invention may be effected in one or more, e.g. 1, 2 or 3, polymerization reactors, using conventional polymerization techniques, e.g. gas phase, solution phase, slurry or bulk polymerization.

In general, a combination of slurry (or bulk) and at least one gas phase reactor is often preferred, particularly with the reactor order being slurry (or bulk) then one or more gas phase reactors.

In case of propylene polymerisation for slurry reactors, the reaction temperature will generally be in the range 60 to 110° C. (e.g. 60-90° C.), the reactor pressure will generally be in the range 5 to 80 bar (e.g. 25-70 bar), and the residence time will generally be in the range 0.3 to 5 hours (e.g. 0.5 to 2 hours). The monomer is usually used as reaction medium.

For gas phase reactors, the reaction temperature used will generally be in the range 60 to 115° C. (e.g. 60 to 110° C.), the reactor pressure will generally be in the range 10 to 25 bar, and the residence time will generally be 0.5 to 8 hours (e.g. 0.5 to 4 hours) The gas used will be the monomer optionally as mixture with a non-reactive gas such as nitrogen. In addition to actual polymerisation steps and reactors, the process can contain any additional polymerisation steps, like prepolymerisation step, and any further after reactor handling steps as known in the art.

Generally the quantity of catalyst used will depend upon the nature of the catalyst, the reactor types and conditions and the properties desired for the polymer product. As is well known in the art hydrogen can be used for controlling the molecular weight of the polymer. It is particularly notable that the catalyst of the present invention performs exceptionally well over a wide range of hydrogen concentration used during the polymerisation process, which makes the catalyst beneficial to be used for productions of a wide range of polymers This forms a further aspect of the invention. The activity of the catalysts of the invention is also very high and the polymer productivity levels are excellent.

It is particularly preferred if the process for the manufacture of the homopolymers of the invention is carried out by changing the hydrogen concentration during the polymerisation. By operating therefore at two or more different hydrogen concentrations, a multimodal homopolymer can be produced.

The polymers made by the catalysts of the invention are useful in all kinds of end articles such as pipes, films, moulded articles (e.g. injection moulded, blow moulded, rotomoulded articles), extrusion coatings and so on. The formation of pipes and films is preferred.

As noted above, the catalysts of the invention allow the formation of polypropylene materials with low chain regularity and low melting point but still with relatively high crystallinity, high molecular weight and very low xylene soluble content. This combination of features is highly attractive and it is believed that achieving this combination of features has not previously been achieved.

The invention will now be illustrated by reference to the following non-limiting Examples and figures. FIG. 1 is the GPC curve for example 2d.

Analytical Tests:

Melting Temperature $T_m$ [° C.] and Crystallisation Temperature $T_c$ [° C.]:

Melting temperature ($T_m$), crystallization temperature ($T_c$), were measured (according to ISO 11357-3:1999) with a Mettler TA820 differential scanning calorimetry (DSC) on 5 to 10 mg, typically 8±0.5 mg samples. Both crystallization and melting curves were obtained during 10° C./min cooling and heating scans between 30° C. and 225° C. Melting and crystallization temperatures were taken as the peaks of endotherms and exotherms The peak temperature of the second heating scan was taken as the melting temperature $T_m$.

Melt Flow Rates (MFR):

$MFR_2$ and $MFR_{21}$ [g/10 min]: ISO 1133 (230° C., 2.16 and 21.6 kg load, respectively)

GPC: Molecular weight averages, molecular weight distribution, and polydispersity index (Mn, Mw, MWD, PDI)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPCV2000 instrument, equipped with differential refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ASTM D 6474-99. All samples were prepared by dissolving 0.5-4.0 mg of polymer in 4 mL (at 140° C.) of stabilized TCB (same as mobile phase) and keeping for max. 3 hours at max. 160° C. with continuous gentle shaking prior sampling into the GPC instrument.

Intrinsic Viscosity

Polymer samples were dissolved in decalin at the concentration of 1 mg/ml and at the temperature of 135° C. The relative viscosity of the dilute polymer solution was measured according to the ISO1628-1 by use of an Automated Ubbelohde Capillary Viscometer; LAUDA PVS1. The relative viscosity of the dissolved polymer solution was determined as a ratio of the measured kinematic viscosities of the polymer solution and the pure solvent. Intrinsic viscosity was calculated from a single viscosity measurement at known concentration by use of Huggins equation and known Huggins constant.

$^{13}$C NMR

Quantitative solution state $^{13}$C{$^1$H} nuclear magnetic resonance (NMR) spectra were recorded using a Bruker Avance III 400 NMR spectrometer with a 9.4 T superconducting standard-bore magnet operating at 400.15 and 100.62 MHz for $^1$H and $^{13}$C respectively. Approximately 200 mg of material were dissolved in approximately 3 ml of 1,1,2,2-tetrachloroethane-d$_2$ (TCE-d$_2$) inside a 10 mm NMR tube. The measurements were done at 125° C. using a $^{13}$C optimised 10 mm selective excitation probehead with nitrogen gas for all pneumatics. The data were acquired with standard 90° single-pulse excitation with NOE and bi-level WALTZ16 decoupling scheme. A total of 6144 transients were acquired per spectra using a cycle delay of 3 seconds and an acquisition time of 1.6 second.

The tacticity distribution at the triad level and regioerrors were determined from the quantitative $^{13}$C{$^1$H} NMR spectra after basic assignment as in: V. Busico and R. Cipullo, Progress in Polymer Science, 2001, 26, 443-533, and based on the method described in: C. De Rosa, F. Auriemma, M. Paolillo, L. Resconi, I. Camurati, Macromolecules 2005, 38(22), 9143-9154.

Quantification of the pentad distribution was done through integration of the methyl region in the $^{13}$C{$^1$H} spectra and when applicable corrected for any sites not related to the stereo sequences of interest, e.g. regioerrors.

Xylene Solubles 2.0 g of polymer is dissolved in 250 ml p-xylene at 135° C. under agitation. After 30 minutes the solution is allowed to cool for 15 minutes at ambient temperature and then allowed to settle for 30 minutes at 25° C. The solution is filtered with filter paper into two 100 ml flasks. The solution from the first 100 ml vessel is evaporated in nitrogen flow and the residue is dried under vacuum at 90° C. until constant weight is reached. XS %=(100·m·Vo)/(mo·v); mo=initial polymer amount (g); m=weight of residue (g); Vo=initial volume (ml); v=volume of analysed sample (ml).

Al and Zr Determination (ICP-Method)

The elementary analysis of a catalyst was performed by taking a solid sample of mass, M, cooling over dry ice. Samples were diluted up to a known volume, V, by dissolving in nitric acid (HNO$_3$, 65%, 5% of V) and freshly deionised (DI) water (5% of V). The solution was then added to hydrofluoric acid (HF, 40%, 3% of V), diluted with DI water up to the final volume, V, and left to stabilise for two hours. The analysis was run at room temperature using a Thermo Elemental IRIS Advantage XUV Inductively Coupled Plasma—Atomic Excitation Spectrometer (ICP-AES) which was calibrated immediately before analysis using a blank (a solution of 5% HNO$_3$, 3% HF in DI water), a low standard (10 ppm Al in a solution of 5% HNO$_3$, 3% HF in DI water), a high standard (50 ppm Al, 20 ppm Zr in a solution of 5% HNO$_3$, 3% HF in DI water) and a quality control sample (20 ppm Al, 10 ppm Zr in a solution of 5% HNO$_3$, 3% HF in DI water). The content of zirconium was monitored using the 339.198 nm line, the content of aluminium via the 396.152 nm line and the potassium using the 766.490 nm line. The reported values, required to be between 0 and 100, or further dilution is required, are an average of three successive aliquots taken from the same sample and are related back to the original catalyst using equation 1.

$$C = \frac{R \times V}{M} \qquad \text{Equation 1}$$

Where: C is the concentration in ppm, related to % content by a factor of 10,000
R is the reported value from the ICP-AES
V is the total volume of dilution in ml
M is the original mass of sample in g
If dilution was required then this also needs to be taken into account by multiplication of C by the dilution factor.

Tensile Measurements

Stress-strain curves have been generated with a Zwick Z010 instrument according to ISO 527-1,2, on S2 specimens cut out from compression moulded 100×100×2 mm plates, using test speed of 1 mm/min for tensile modulus (up to 0.25% deformation) and 50 mm/min for the rest of the test. The tensile modulus (Et) was determined from the slope of the stress strain curve σ(ε) in the strain interval 0.05%≤ε≤0.25%, calculated as secant slope n this interval:

$$E_t = \frac{\sigma_2 - \sigma_1}{\varepsilon_2 - \varepsilon_1}$$

where Et is the tensile modulus, expressed in megapascals; σ1 is the stress, in megapascals, measured at the strain value ε1=0.0005 (0.05%); σ2 is the stress, in megapascals, measured at the strain value ε2=0.0025 (0.25%).

EXAMPLES

Chemicals: rac-dimethylsilyl-bis(2-methyl-4-phenyl-5-methoxy-6-tert-butylinden-1-yl)dichlorozirconium (M=801.08 g/mol, CAS 952610-29-6) was prepared as described in WO2007/116034. It was verified that its $^1$H NMR spectrum corresponds to the one reported in the above mentioned patent application. rac-cyclohexyl(methyl)silanediylbis[2-methyl-4-(4'-tert-butylphenyl)indenyl]zirconium dichloride was purchased from commercial sources (CAS 888227-55-2).

MAO was purchased from Albermarle and used as a 30 wt-% solution in toluene. Perfluoroalkylethyl acrylate esters (CAS number 65605-70-1) were purchased from the Cytonix Corporation, dried and degassed prior to use. Hexadecafluoro-1,3-dimethylcyclohexane was dried and degassed prior to use. Propylene was provided by Borealis and adequately purified before use. Triethylaluminum was purchased from Crompton and used in pure form. Hydrogen is provided by AGA and purified before use.

All the chemicals and chemical reactions were handled under an inert gas atmosphere using Schlenk and glovebox techniques, with oven-dried glassware, syringes or needles.

Catalyst Example 1 E1 (Invention)

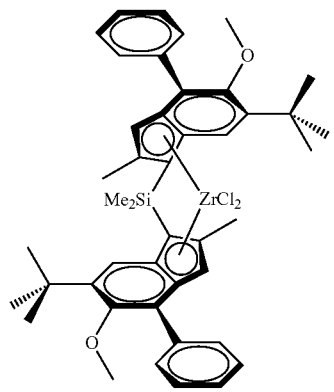

The catalyst in solid particulate form with no external carrier was prepared according to the procedure described in the Example 5 of WO 2003/051934 with hexadecafluoro-1,3-dimethylcyclohexane as the continuous phase, a mixture of perfluoroalkylethyl acrylate esters having different perfluoroalkyl chain lengths as the surfactant precursor and (rac-dimethylsilyl-bis(2-methyl-4-phenyl-5-methoxy-6-tert-butylinden-1-yl)dichlorozirconium as the metallocene.

The detailed catalyst preparation was performed as follows: Inside a glovebox, 80 μL of dry and degassed perfluoroalkylethyl acrylate esters were mixed with 2 mL of MAO in a septum bottle and left to react overnight (surfactant solution). The following day, 60.60 mg of the metallocene were dissolved in 4 mL of the MAO solution in another septum bottle and left to stir inside the glovebox (catalyst solution).

After 60 minutes, the 4 mL of the catalyst solution and 1 mL of the surfactant solution were successively added into a 50 mL emulsification glass reactor containing 40 mL of hexadecafluoro-1,3-dimethylcyclohexane at −10° C. and equipped with an overhead stirrer (stirring speed=600 rpm). A red-orange emulsion formed immediately (measured emulsion stability=14 seconds) and was stirred during 15 minutes at 0° C./600 rpm. The emulsion was then transferred via a 2/4 Teflon tube to 100 mL of hot hexadecafluoro-1,3-dimethylcyclohexane at 90° C., and stirred at 600 rpm until the transfer was completed. The stirring speed was reduced to 300 rpm and the oil bath was removed. Stirring was continued at room temperature for 15 more minutes. When the stirrer was switched off, the catalyst was left to settle up on top of the continuous phase which was siphoned off after 45 minutes. The remaining red solid catalyst was dried during 2 hours at 50° C. over an argon flow. 0.39 g of a red free flowing powder was obtained.

Catalyst Example 2 E2 (Invention)

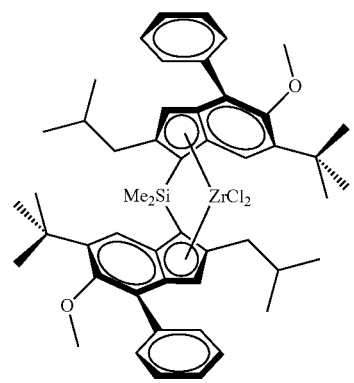

rac-dimethylsilanediylbis(2-iso-butyl-4-phenyl-5-methoxy-6-tert-butylinden-1-yl) zirconium dichloride (Molecular Weight: 885.24 g/mol)

The catalyst in solid particulate form with no external carrier was prepared according to the above described procedure for Example 1 with (rac-dimethylsilyl-bis(2-isobutyl-4-phenyl-5-methoxy-6-tert-butylinden-1-yl)dichlorozirconium as the metallocene. 73.4 mg of the metallocene in its toluene solvate form (0.88 equ. toluene) were used in the synthesis and 0.39 g of the catalyst were obtained in the form of a red free flowing powder.

Catalyst Example 3 E3 (Invention)

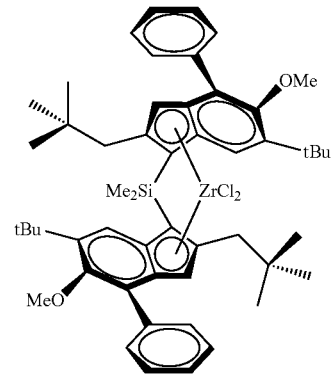

The catalyst in solid particulate form with no external carrier was prepared according to the above described procedure for Example 1 using 69.5 mg g of rac-dimethylsilylene-bis(6-tert-butyl-2-(2,2-dimethylpropyl)-5-methoxy-4-phenyl-1H-inden-1-yl)zirconium dichloride. 0.68 g of a red free flowing powder was obtained.

Comparative Example 1 (CE1)

The catalyst of the invention was compared to a catalyst in solid particulate form without external carrier prepared according to the above described procedure with hexadecafluoro-1,3-dimethylcyclohexane as the continuous phase, a mixture of perfluoroalkylethyl acrylate esters having different perfluoroalkyl chain lengths as the surfactant precursor and rac-cyclohexyl(methyl)silanediylbis[2-methyl-4-(4'-tert-butylphenyl)indenyl]zirconium dichloride as the metallocene (comparative example 1).

Catalyst results are disclosed in Table 1.

TABLE 1

Catalyst syntheses summary

| | | ICP analyses | | |
|---|---|---|---|---|
| Code | Yield | Al(%) | Zr(%) | Al/Zr (molar) |
| Example 1 | 0.39 g | 23.50 | 0.32 | 248 |
| Example 2 | 0.39 g | 28.7 | 0.33 | 294 |
| Example 3 | 0.68 g | 25.8 | 0.31 | 281 |
| Comp Ex 1 | 1.2 g | 31.00 | 0.37 | 283 |

Polymerisation:
Homopolymerisation of Propylene

The polymerisations were performed in a 5 L reactor. 200 μl of triethylaluminum was fed as a scavenger in 5 mL of dry and degassed pentane. The desired amount of hydrogen was then loaded (measured in mmol) and 1100 g of liquid propylene was fed into the reactor. The temperature was set to 30° C. The desired amount of catalyst (7 to 30 mg) in 5 mL of hexadecafluoro-1,3-dimethylcyclohexane is flushed into the reactor with a nitrogen overpressure. The temperature is then raised to 70° C. over a period of 15 minutes. The polymerisation is stopped after 30 minutes by venting the reactor and flushing with nitrogen before the polymer is collected.

The polymerisation results and polymer analyses are displayed in Tables 2a-2d.

TABLE 2a

Polymerisation table (The numbers displayed in italic are calculated values)

| Run | Cat | H₂ (mmol) | Activity Kg/g cat/h | Metal Activity (kg/g zr/h) | MFR₂ (g/10 min) | MFR₂₁ (g/10 min) | IV (dL/g) | M_W (kg/mol) | Mw/Mn | Tm (°C.) | Tc (°C.) | XS (wt-%) | mm (%) | 2.1 errors (%) | 3.1 errors (%) |
|---|---|---|---|---|---|---|---|---|---|---|---|---|---|---|---|
| 1 | E 1 | 0.00 | 11.40 | 3563 | | 0.80 | 7.84 | 1087 | 1.9 | 142.60 | 104.90 | 0.1 | 99.85 | 1.80 | 0.0 |
| 2 | E 1 | 1.00 | 27.60 | 8625 | | 2.10 | 6.41 | 994 | 2.1 | 142.60 | 104.30 | <0.1 | 99.85 | 1.75 | 0.0 |
| 3 | E 1 | 6.00 | 45.10 | 14094 | 0.33 | — | 3.68 | 524 | 2.6 | 143.30 | 105.10 | 0.2 | 99.75 | 1.70 | 0.0 |
| 4 | E 1 | 15.00 | 67.50 | 21094 | 3.50 | — | 1.95 | 309 | 2.7 | 145.60 | 107.40 | 0.3 | 99.70 | 1.65 | 0.0 |
| 5 | E 1 | 25.00 | 62.90 | 19656 | 14.80 | — | 1.50 | 207 | 3.2 | 144.70 | 109.40 | — | 99.50 | 1.65 | 0.0 |
| 6 | CE 1 | 0.00 | 7.80 | 2108 | | 5.90 | 4.84 | 757 | 2.3 | 149.20 | 110.70 | — | — | — | |
| 7 | CE 1 | 6.00 | 22.30 | 6027 | 1.30 | — | 2.56 | 416 | 2.1 | 151.20 | 110.30 | — | — | — | |
| 8 | CE 1 | 15.00 | 28.50 | 7703 | 12.30 | — | 1.67 | 222 | 2.4 | 151.00 | 112.10 | — | — | — | |

TABLE 2b

Homopolymerisation examples

| Catalyst | Exp. | Cat (mg) | Temp. (°C.) | Time (min.) | H₂ (mmol) | Polymer (g) | Activity (kg/g/h) | Metal activity (kg/g Zr/h) |
|---|---|---|---|---|---|---|---|---|
| E2 | P1 | 12.9 | 70.0 | 30.0 | 1.0 | 158 | 24.5 | 7424 |
| E2 | P2 | 4.8 | 70.0 | 30.0 | 6.0 | 117 | 48.8 | 14788 |
| E2 | P3 | 7.4 | 70.0 | 30.0 | 15.0 | 220 | 59.5 | 18030 |
| E3 | P4 | 10.2 | 70.0 | 30.0 | 1.0 | 135 | 26.5 | 8548 |
| E3 | P5 | 10.7 | 70.0 | 30.0 | 6.0 | 244 | 45.6 | 14710 |
| E3 | P6 | 5.9 | 70.0 | 30.0 | 15.0 | 153 | 51.9 | 16742 |

TABLE 2c

Polymer analyses

| Catalyst | Exp. | MFR₂ (g/10 min) | MFR₂₁ (g/10 min) | M_w exp. (kg/mol) | MWD | $T_m$ (°C.) | $T_c$ (°C.) | XS (%) |
|---|---|---|---|---|---|---|---|---|
| E2 | P1 | | 2.0 | 1171 | 2.4 | 144.7 | 105.7 | 0.3 |
| E2 | P2 | 0.8 | 64.0 | 474 | 2.6 | nd | 105.3 | 0.2 |
| E2 | P3 | 7.5 | — | 258 | 2.4 | 145.4 | 108.2 | 0.4 |
| E3 | P4 | | 2.3 | 1024 | 2.2 | 146.6 | 104.1 | nd |
| E3 | P5 | 1.1 | | 403 | 2.4 | 146.9 | 106.4 | nd |
| E3 | P6 | 23.2 | | 183 | 2.3 | 146.5 | 108.4 | nd |

(nd = not determined)

TABLE 2d $^{13}$C NMR analyses

| Catalyst | Exp. | mm % | 2,1e % |
|---|---|---|---|
| E2 | P1 | 99.5 | 1.6 |
| E2 | P2 | 99.7 | 1.5 |
| E2 | P3 | 99.6 | 1.5 |

Comparative Example 2

The catalysts of the invention are also compared to Examples 5 and 6 of WO2007/116034, i.e. a catalyst with MAO in solution polymerisation.

The DSC analyses clearly show that the polymer obtained with the solid particulate catalyst of the invention differs from the polymers obtained with the same catalyst complex but in solution polymerisation (Table 3). The polymers of the present invention (entries 1-5, Table 2) produced at 70° C. in bulk propylene exhibit a lower melting temperature than examples 5 and 6 of W2007/116034 produced at 100° C. and 120° C. respectively in a liquid mixture of propylene and cyclohexane. This lower melting temperature can be explained by the higher amount of 2.1 regio-errors identified by NMR spectroscopy (see table 2) compared to examples 5 and 6 of WO2007/116034 (1.7% vs. 0.6%). The polymers formed by the catalysts of the invention are thus less regio-regular.

TABLE 3

| Ex* | Mw (kg/mol) | Mw/Mn | Tm (°C.) | 2.1% | 3.1% |
|---|---|---|---|---|---|
| 5 | 717.00 | 2.70 | 150.60 | 0.6 | 0.1 |
| 6 | 298.00 | 2.50 | 147.80 | 0.6 | 0.5 |

*(of WO2007/116034)

Additional Polymerisation Examples with Prepolymerised Catalysts of the Invention E2 and E3
Off-line Prepolymerization Procedure Off-line pre-polymerisation experiments were done in a 125 mL pressure reactor equipped with gas-feeding lines and an overhead stirrer. Dry and degassed perfluoro-1,3-dimethylcyclohexane (15 cm3) and the desired amount of the red catalyst to be pre-polymerised were loaded into the reactor inside a glovebox and the reactor was sealed. The reactor was then taken out from the glovebox and placed inside a water cooled bath. The overhead stirrer and the feeding lines were then connected. The feeding line was pressurized with hydrogen, and the experiment was started by opening the valve between the $H_2$ feed line and the reactor. At the same time propylene feed was started through the same $H_2$ feeding line in order to ensure that all the hydrogen would be fed into the reactor. The propylene feed was left open, and the monomer consumption was compensated by keeping the total pressure in the reactor constant (about 5 barg). The experiment was continued until a polymerisation time sufficient to provide the desired degree of polymerisation. The reactor was then taken back inside the glovebox before opening and the content was poured into a glass vessel. The perfluoro-1,3-dimethylcyclohexane was evaporated until a constant weight was obtained to yield a pre-polymerised pink catalyst. The degree of polymerisation was determined gravimetrically and/or by analysis of the ash and/or aluminium content of the catalyst.

Polymerisation Example 2a

Batch Production of Polypropylene Homopolymer (hPP) with the Metallocene Catalyst of Example 2 (E2)

A stirred autoclave (double helix stirrer) with a volume of 21.2 dm³ containing 0.2 barg propylene is filled with additional 3.97 kg propylene. After adding 0.4 normal liters of hydrogen and 0.73 mmol triethylaluminium (1 molar solution in dry and degassed hexane) using a stream of 250 g propylene, the solution was stirred at 20° C. and 150 rpm. After 20 min, 77 mg of a pre-polymerized version of Ex 2 catalyst prepared according to the above described method for off-line catalyst prepolymerisation (reaction time 13 minutes, degree of prepolymerisation 2.45) was contacted with 5 ml hexadecafluoro-1,3-dimethylcyclohexane under nitrogen-pressure (0.003 mol at ~10 barg) for 60 sec and spilled into the reactor with 250 g propylene. Stirring speed was increased to 250 rpm and pre-polymerisation was run for 15 min.

After that, the stirring speed is increased to 350 rpm. An adequate amount of hydrogen to achieve the specified target $MFR_2$ is added and the temperature in the reactor increased to 70° C. over ~18 min. This temperature was maintained for 30 min after achieving 68° C. Then the reaction was stopped by adding 5 ml methanol, cooling of reactor and flashing of volatile ingredients.

After 3 times spilling the reactor with nitrogen and one vacuum/nitrogen cycle, the product was removed and dried over night in a hood and additionally 2 hours in a vacuum drying oven at 60° C. Further polymers were produced by varying the hydrogen level.

Polymerisation Example 2b

Batch Production of Bimodal hPP with a Metallocene Catalyst of Example 2 (E2)
A stirred autoclave (double helix stirrer) with a volume of 21.2 dm³ containing 0.2 barg propylene was filled with additional 3.97 kg propylene. After adding 0.4 normal liters of hydrogen and 0.73 mmol triethylaluminium (1 molar solution in dry and degassed hexane) using a stream of 250 g propylene, the solution was stirred at 20° C. and 150 rpm. After 20 min, 66 mg of a pre-polymerized version of Ex 2 catalyst prepared according to the above described method for off-line catalyst prepolymerisation (reaction time 15 minutes, degree of prepolymerisation 3.9) was contacted with 5 ml hexadecafluoro-1,3-dimethylcyclohexane under nitrogen pressure (0.003 mol at ~10 barg) for 60 sec and spilled into the reactor with 250 g propylene. Stirring speed is increased to 250 rpm and pre-polymerisation is running 15 min. After that the stirring speed is increased to 350 rpm. An adequate amount of hydrogen to achieve an MFR of 0.7 g/10 min is added and the temperature in the reactor increased to 70° C. over ~19 min. This temperature was maintained for 30 min after achieving 68° C. After that 2.19 normal liters hydrogen was added at a rate of 2.19 ln/min and the temperature held constant for an additional 126 min. Then the reaction was stopped by adding 5 ml methanol, cooling of reactor and flashing of volatile ingredients.

Drying is done like in the example above.

Polymerisation Example 2c

Batch Production of Bimodal hPP with a Catalyst of Example 2 (E2)
The example is carried out as per Example 2b except that before addition of the metallocene, reactor temperature is increased to 40° C. and 109 mg of the solid, pre-polymerized catalyst was added.

The step 1 residence time was 25 min and the step 2 residence time was 246 min.

Polymerisation Example 2d

Batch Production of Bimodal hPP with a Metallocene Catalyst
A stirred autoclave (double helix stirrer) with a volume of 21.2 dm³ containing 0.2 barg propylene was filled with additional 3.97 kg propylene. After adding 0.2 normal liters of hydrogen and 0.73 mmol triethylaluminium (1 molar solution in dry, degassed hexane) using a stream of 250 g propylene the solution is stirred at 20° C. and 250 rpm. After 20 min the temperature is increased to 40° C. and 153 mg of the solid, pre-polymerized catalyst from Polymerisation Example 2b (degree of prepolymerisation 3.9) was contacted with 5 ml hexadecafluoro-1,3-dimethylcyclohexane under nitrogen pressure (0.003 mol at ~10 barg) for 60 sec and spilled into the reactor with 250 g propylene. After that the stirring speed was increased to 350 rpm. An adequate amount of hydrogen to achieve an MFR2 of 0.67 g/10 min was added and the temperature in the reactor increased to 70° C. during ~14 min. This temperature was maintained for 30 min after achieving 68° C. After that 3.4 normal liters of hydrogen was added with continuously increasing flow rate from 0 up to 0.68 normal liters/min over 10 min and the temperature maintained constantly for an additional 41 min. Then the reaction was stopped by adding 5 ml methanol, cooling of reactor and flashing of volatile ingredients.

Drying of the product is done like in the example above.

Comparative Example 3

Batch Production of Polypropylene Homopolymer with a Metallocene Catalyst Prepared According to a Procedure Similar to Catalyst Comparative Example 1 and Prepolymerised Similarly to the Off-Line Prepolymerisation Procedure Described Above. (Prepolymerisation Degree 2.9)
A stirred autoclave (double helix stirrer) with a volume of 21.2 dm³ containing 0.2 barg propylene was filled with additional 3.97 kg propylene. After adding 0.4 normal liters hydrogen and 0.73 mmol triethylaluminium (1 molar solution in dry and degassed hexane) using a stream of 250 g propylene, the solution was stirred at 20° C. and 150 rpm. After 20 min 401 mg of the solid, pre-polymerized catalyst was contacted with 5 ml hexadecafluoro-1,3-dimethylcyclohexane under nitrogen-pressure (0.003 mol at ~10 barg) for 60 sec and spilled into the reactor with 250 g propylene. Stirring speed is increased to 250 rpm and pre-polymerisation was run for 15 min. After that the stirring speed was increased to 350 rpm. An adequate amount of hydrogen to achieve the specified target MFR2 of 7.6 g/10 min was added and the temperature in the reactor increased to 70° C. over ~19 min. This temperature was maintained for 30 min after achieving 68° C. Then the reaction was stopped by adding 5 ml methanol, cooling of reactor and flashing of volatile ingredients.

After 3 times spilling the reactor with nitrogen and one vacuum/nitrogen cycle the product was remove and dried over night in a hood and additionally 2 hours in a vacuum drying oven at 60° C.

The polymerisation details and results of these experiments are presented in Tables 4-6.

TABLE 4

| | Prepolymerization | | | | Step 1 | | | | | Step 2 | | | | |
|---|---|---|---|---|---|---|---|---|---|---|---|---|---|---|
| Example | temp. °C. | res. Time Min | H2 NL | C3 total g | temp. (av.) step 1 °C. | H2 step 1 NL | H2-dosing rate step 1 NL/min | res. time step 1 min | temp. step 2 °C. | H2 step 2 NL | H2-dosing rate step 1 NL/min | res.time step 2 min | total yield g |
| CE3 | 20 | 15 | 0.4 | 4600 | 70 | 2 | 0.133 | 30 | | | | | 903 |
| Ex 2 a | 20 | 15 | 0.4 | 4600 | 70 | 2.72 | 0.193 | 30 | | | | | 709 |
| Ex 2 a-1 (*) | 20 | 15 | 0.4 | 4600 | 70 | 1.43 | 0.0853 | 30 | | | | | 962 |
| Ex 2 a-2 (**) | 40 | 0 | 0.2 | 4600 | 70 | 0.2 | 0.200 | 30 | | | | | 403 |
| Ex 2 b | 20 | 15 | 0.4 | 4460 | 70 | 1.43 | 0.086 | 30 | 70.00 | 3.63 | 1.90 | 126.5 | 973 |
| Ex 2 c | 40 | 15 | 0.4 | 4460 | 70 | 1.43 | 0.120 | 25 | 70.00 | 3.63 | 0.18 | 246.0 | 2034 |
| Ex 2 d | 40 | 0 | 0.2 | 4450 | 70 | 0.2 | 0.200 | 30 | 69.83 | 3.60 | 0.34 | 41.0 | 1570 |

NL = Normal liter.
(*) catalyst amount: 97 solid, pre-polymerized catalyst of 2.45 prepolymerization degree
(**) catalyst amount: 100 mg solid, pre-polymerized catalyst of 3.9 prepolymerization degree.

TABLE 5

| | Properties | | | | | | | | |
|---|---|---|---|---|---|---|---|---|---|
| Example | $M_n$ g/mol | $M_w$ g/mol | $M_z$ g/mol | $M_v$ g/mol | $M_w/M_n$ | $MFR_2$ | XS wt % | Tc °C. | Tm °C. |
| CE3 | 67000 | 219000 | 405000 | 198000 | 3.3 | 7.6 | | 106.4 | 151.5 |
| Ex 2 a-1 | | | | | | 0.7 | 0.42 | 97 | 145.2 |
| Ex 2 a-2 | 504000 | 1181000 | 2075000 | 1082000 | 2.34 | 0.01 | 0.47 | 99.5 | 143.9 |
| Ex 2 a | 57000 | 190000 | 356000 | 171000 | 3.3 | 10.8 | 0.35 | 102.2 | 145.7 |
| Ex 2 b | 77000 | 279000 | 625000 | 243000 | 3.6 | 3.4 | 0.49 | 97.4 | 146.3 |
| Ex 2 c | 73000 | 234000 | 525000 | 205000 | 3.2 | 6.0 | 0.19 | 109.6 | 146.5 |
| Ex 2 d | 42000 | 429000 | 1447000 | 339000 | 10.1 | 0.67 | 0.15 | 113 | 146.6 |

TABLE 6

| | NMR & Tensile Data | | | | | | |
|---|---|---|---|---|---|---|---|
| Example | [mm] | [rr] | [2,1e] | [3,1] | Tensile modulus (MPa) | Tensile stress at break (MPa) | Tensile strain at break (%) |
| CE3 | 99.48 | 0.17 | 0.94 | 0 | 1699 | 36.3 | 9.4 |
| Ex 2 a | 99.66 | 0.11 | 1.47 | 0.01 | 1591 | 35.1 | 9.9 |
| Ex 2 b | 99.72 | 0.09 | 1.58 | 0 | 1601 | 21.3 | 119 |
| Ex 2 c | 99.78 | 0.07 | 1.43 | 0 | 1605 | 22.5 | 118 |
| Ex 2 d | 99.75 | 0.08 | 1.55 | 0 | 1721 | Nd | Nd |

Effect of Nucleation

Examples 2c and 2d were nucleated with 0.15 wt % NA11. Crystallisation temperatures and tensile moduli were measured. The crystallisation temperature of 2c increased from 109.6 to 119.8° C. The crystallisation temperature of example 2d increased from 113 to 119.5° C. The tensile modulus of example 2d increased from 1721 to 1840 MPa.

The invention claimed is:

1. A polypropylene homopolymer having a melting point of less than 147° C., a percentage of 2.1 errors of at least 1% and a xylene soluble fraction of less than 0.5 wt %.

2. The polypropylene homopolymer of claim 1, having a melting point of less than 145° C., a percentage of 2.1 errors of at least 1.5% and a xylene soluble fraction of less than 0.5 wt %.

3. The polypropylene homopolymer of claim 1, having a tensile modulus of less than 1680 MPa; an rr triad content of less than 0.2%; and a Mw/Mn of less than 4.

4. The polypropylene homopolymer of claim 1, having a tensile modulus of less than 1900 MPa; an rr triad content of less than 0.2%; and a Mw/Mn of more than 3.4.

5. The polypropylene homopolymer of claim 3, having a percentage of 2.1 errors of at least 1.4%.

6. A nucleated polypropylene homopolymer, having a melting point of less than 150° C.; a xylene soluble fraction of less than 1 wt %; and a percentage of 2.1 errors of at least 1%.

7. The nucleated polypropylene homopolymer of claim 6, having a tensile modulus of at least 1650 MPa; a Tc of at least 115° C.; and a rr triad content of less than 0.2%.

8. The homopolymer of claim 1, obtained using a solid, particulate catalyst comprising:

(i) a complex of formula (I):

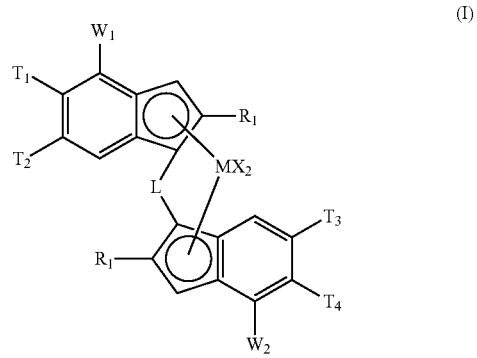

wherein

M is zirconium or hafnium;

each X is a sigma ligand;

L is a divalent bridge selected from —R'$_2$C—, —R'$_2$C—CR'$_2$—, —R'$_2$Si—, —R'$_2$Si—SiR'$_2$—, or —R'$_2$Ge— wherein each R' is independently a hydrogen atom, C1-C20-alkyl, tri(C1-C20-alkyl)silyl, C6-C20-aryl, C7-C20-arylalkyl or C7-C20-alkylaryl;

each $R_1$ independently is a linear or branched C1-C20 hydrocarbyl radical optionally containing one or more heteroatoms from groups 14-16;

$T_1$ and $T_4$, which are the same or different, are an $OR^2$, a $SR^2$, $CH(R^{18})_2$, $CH_2R^{18}$, aryl or heteroaryl group;

each $R^2$, which are the same or different, is a C1-C20 hydrocarbyl radical;

each $R^{18}$, which are the same or different, is a C1-C20 hydrocarbyl radical or two $R^{18}$ groups together with the carbon atom to which they are attached may form a cyclic C4-C20 hydrocarbyl group;

$T_2$ and $T_3$, which are the same or different, are a $C(R^{18})_3$ group;

$W_1$ and $W_2$, which are the same or different, are a 5 or 6 membered aryl or heteroaryl ring wherein each atom of said ring is optionally substituted with an $R^5$ group;

each $R^5$, which are the same or different, is a C1-C20 hydrocarbyl radical optionally containing one or more heteroatoms belonging to groups 14-16; and optionally two adjacent $R^5$ groups taken together can form a further mono or multicyclic ring condensed to $W_1$ or $W_2$, optionally substituted by one or two groups $R_5$; and (ii) a cocatalyst.

9. The polypropylene homopolymer of claim 8, wherein the solid, particulate catalyst is free of an external carrier and comprises (i) a complex of formula (I) and (ii) a cocatalyst.

10. The polypropylene homopolymer of claim 8, wherein the solid, particulate catalyst is free of an external carrier and is obtained by a process in which (I) a liquid/liquid emulsion system is formed, the liquid/liquid emulsion system comprising a solution of the catalyst components (i) and (ii) dispersed in a solvent so as to form dispersed droplets therewith; and (II) solid particles are formed by solidifying said dispersed droplets.

11. The polypropylene homopolymer of claims 8, wherein the complex is of formula (II):

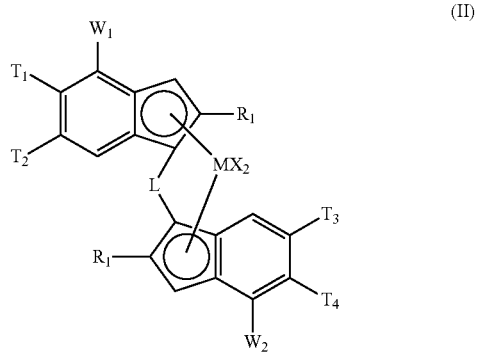

(II)

wherein

M is Zr or Hf;

$R_1$ is a linear or branched C1-C10 alkyl;

L is ethylene or $SiR^6_2$;

$R^6$ is C1-C10 alkyl;

each X is a hydrogen atom, a halogen atom, an OR, or an R group;

R is methyl, ethyl, isopropyl, trimethylsilyl, or a C6-C10 aryl;

$W_1$ and $W_2$ are a phenyl derivative or thiophenyl derivative optionally carrying one or two $R^5$ groups $R^5$ is C1-C10 alkyl or two adjacent $R^5$ groups taken together can form a further mono or multicyclic ring condensed to $W_1$ or $W_2$;

$T_1$ is OC1-C6 alkyl or a C6-C10 aryl;

$T_2$ is $C_4$-$C_{10}$ hydrocarbyl;

$T_3$ is $C_4$-$C_{10}$ hydrocarbyl; and $T_4$ is OC1-C6 alkyl or a C6-C10 aryl.

12. The polypropylene homopolymer of claim 1, which is multimodal.

13. The polypropylene homopolymer of claim 1, whose GPC curve shows two distinct maxima.

14. The polypropylene homopolymer of claim 1, which has an Mw of at least 200,000.

15. The polypropylene homopolymer of claim 1, comprising a nucleating agent.

16. The polypropylene homopolymer of claim 1, having an Mw/Mn of 2 to 20.

17. A process for the preparation of the polypropylene homopolymer, the process comprising polymerising propylene in the presence of the catalyst of claim 10.

18. An article comprising the polypropylene homopolymer of claim 1.

* * * * *